Sept. 15, 1970  C. H. KELLER, JR., ET AL  3,528,713
FUSIBLE SHIM FOR PRELOADED BEARING
Filed Jan. 13, 1969
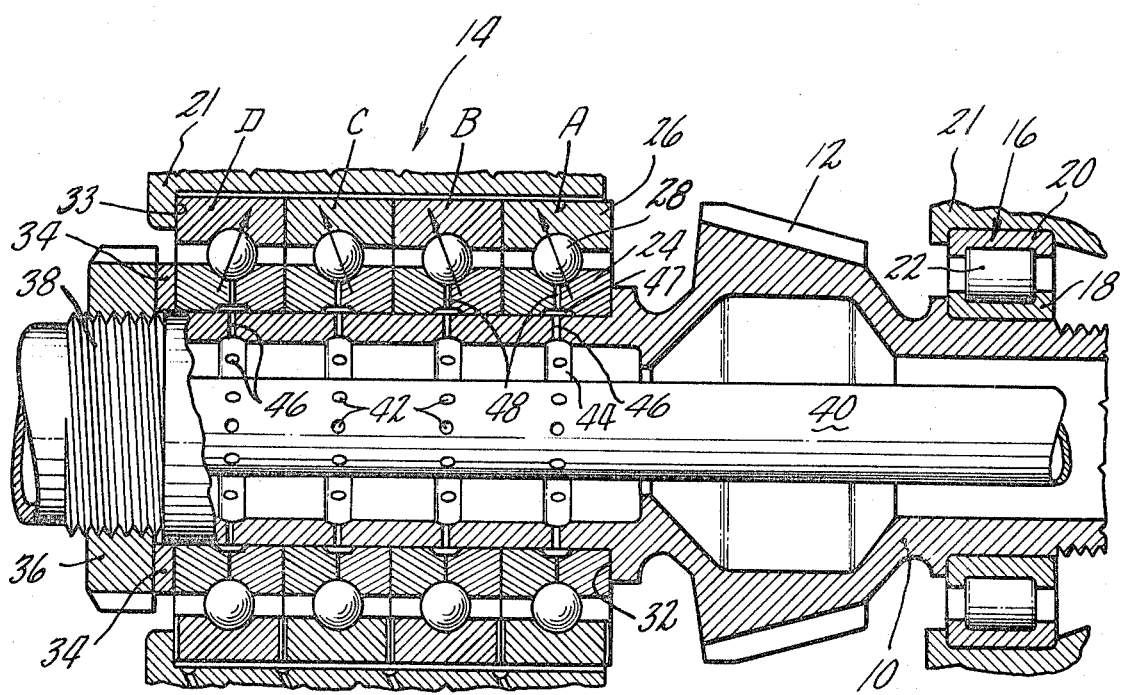
INVENTORS
C. H. KELLER, JR.
A. BURTON JONES, JR.
BY M. B. Tasker
ATTORNEY United States Patent Office 3,528,713
Patented Sept. 15, 1970

3,528,713
FUSIBLE SHIM FOR PRELOADED BEARING
Carl Hess Keller, Jr., Southport, and Arthur Burton Jones, Jr., Newington, Conn., assignors to United Aircraft Corporation, East Hartford, Conn., a corporation of Delaware
Filed Jan. 13, 1969, Ser. No. 790,621
Int. Cl. F16c 13/00
U.S. Cl. 308—189          9 Claims

ABSTRACT OF THE DISCLOSURE

An antifriction bearing, which is capable of being preloaded comprises two or more separate bearing units each including an inner ring mounted on a shaft, an outer ring installed in a housing and a clamping device which will provide retention of the bearing assembly and internal load or looseness in the separate bearings. A shim of a predetermined melting point is positioned between the clamping member and an adjacent bearing race which melts upon lubrication failure and reduces the internal load on the bearing.

The invention described herein was made in the course of or under a contract or sub-contract thereunder with the Department of the U.S. Army.

CROSS-REFERENCE TO RELATED APPLICATIONS

There are no relating copending patent applications.

BACKGROUND OF THE INVENTION

This invention relates to antifriction bearings, sometimes referred to as rolling-contact bearings, which may utilize either balls or rollers between inner and outer bearing races. The invention is particularly concerned with bearings capable of being preloaded. In the event of overheating, possibly due to lubrication failure, the internal bearing geometry is changed as a result of different thermal expansions of the component parts which may cause increasing loads on the bearing elements. This further aggravates the heating and differential expansion effects and ultimately seizure and failure of the bearing results.

Field of the invention

The instant invention is well adapted for utilization in the helicopter bearings illustrated in U.S. Pat. No. 3,369,611 issued Feb. 20, 1968 to Luigi Vacca et al.

Description of the prior art

Various devices have been proposed for preventing failure of a bearing when it becomes differentially heated as a result of failure of its lubrication supply. It has been proposed to store an auxiliary supply of lubricant in the vicinity of the bearing which is released by the melting of a fusible plug when the bearing overheats. Such an arrangement is shown in Pat. No. 3,231,317, issued Jan. 25, 1966 to Walter H. Dudar. This arrangement has the disadvantage that when the fusible plug melts the passage leading to the auxiliary lubricant is frequently obstructed by hardened and dried lubricant. Also if the bearing is preloaded this arrangement does not relieve the preload.

In Pat. No. 3,106,432 issued Oct. 8, 1963, to Opferkuch a bimetallic disk is utilized to flex upon overheating to maintain a predetermined end play in a tapered sleeve bearing in which it is essential that some end play always be present to prevent seizure. This arrangement is not adaptable to bearings in which the inner and outer races are unyieldingly clamped together to provide preload on the bearing.

SUMMARY OF THE INVENTION

The present invention is directed to an improved means for completely and irretrievably relieving the internal load on a bearing in the event that the bearing overheats due, for example, to lack of lubricant. This is accomplished by installing a low-melting-point shim between the bearing and the clamping member. The shim is removed by melting or vaporizing upon overheating of the bearing.

BRIEF DESCRIPTION OF THE DRAWING

The single figure of the drawings is a longitudinal-sectional view through a preloaded thrust bearing embodying the invention.

DESCRIPTION OF THE PREFERRED EMBODIMENT

In the drawing, a hollow shaft 10 has formed integral therewith one of the mating gears 12 of a pair of bevel gears. Gear 12 may be formed integral with the shaft, as shown, or may be separately formed and keyed thereto. Shaft 10 is mounted for rotation in two bearings generally indicated by 14 and 16 located respectively at the left and right-hand sides of gear 12.

Bearing 16 is a typical cylindrical roller bearing having an inner race 18 mounted on shaft 10 and an outer race 20 installed in an enclosing casing 21. Rollers 22 are provided between races 18 and 20 in the usual manner. Bearing 16 is a conventional roller bearing designed to take radial loads only.

Bearing 14 is an assembly consisting of a four-bearing set of split-inner-race ball bearings, indicated as A, B, C and D, of a type designed to take both axial loads and radial loads. Each bearing of the set consists of an annular split inner race 24 mounted on shaft 10 and an annular outer race 26 installed in the casing 21 which supports the shaft. Races 24 and 26 have confronting annular grooves to receive balls 28. It will be noted that of the four ball bearings comprising the bearing assembly 14 units A, B, and C are positioned side-by-side with their inner and outer races abutting and with the inner race of bearing unit A abutting a shoulder 32. Also it should be noted that these bearing units are so located that the inner-race units are capable of transmitting components of axial forces in the direction of the load lines in the drawing.

Bearing unit D, however, is reversed so that it opposes the thrust of bearing units A, B, and C and can provide either preload or controlled end play to the bearing assembly 14. In this way the axial thrust of shoulder 32 is transmitted through the several bearing units to the shoulder 33 on casing 21. The inner bearing race of unit D is clamped through an annular low-melting-point shim 34 by a clamping nut 36 threaded onto the threaded portion 38 of shaft 10.

Lubricating oil is introduced through an axial lube tube 40 from which oil flows through openings 42 in the tube sidewalls into annular grooves 44 on the internal surface of shaft 10 and through radial passages 46 in shaft 10 into grooves 47 formed in split inner races 24. These supply oil to balls 28 through radial passages 48 formed in the confronting side walls of inner races 24.

Attention is directed particularly to the fact that shim 34 abuts the inner race of adjacent bearing unit D. Axial pressure exerted against the bearing assembly 14 by nut 36 through shim 34 is transmitted through bearing units D, C, B and A to shoulder 32. Thus by means of clamping nut 36 it is possible to clamp the bearing assembly 14 which puts the assembly under either a maximum 150# or a maximum .0007" end play. The above figures are given by way of example and are suitable for the bearing installation illustrated.

It will be understood that the thickness of shim 34 has been somewhat exaggerated in the drawing for purposes of illustration. The thickness of this shim, which is made of a low-melting-point material, should be approximately one-half of the end play of the preload bearing unit D plus the axial deflection of the preload bearing unit D under normal operating conditions. The shim can be located at either end of the bearing 14, i.e., adjacent nut 36, as shown, or adjacent shoulder 32.

If the bearing overheats, possibly due to loss of oil, the inner races of bearing units A, B, C and D tend to heat up more than the outer races, thus changing the internal design characteristics of the bearing and causing additional load to be transmitted through the rolling elements. This additional load results in higher temperature differential between the inner and outer races and still greater loading. This sequence ultimately results in seizure and failure of the bearing.

Due to the presence of shim 34, however, undue heating of inner race 24 of bearing unit D will result in melting or vaporizing of shim 34 which will allow the preload bearing D to slide axially along shaft 10 and relieve this internal load. By the presence of fusible shim 34 the rate of temperature rise in the lubrication-dry thrust carrying bearing units is reduced and survival time of the bearing is greatly increased. By melting of the fusible shim the preload is irretrievably removed until such time as the transmission is serviced to correct the lubrication failure.

I wish it to be understood that I do not desire to be limited to the exact details of construction shown and described for obvious modifications will occur to a person skilled in the art.

We claim:

1. In combination, a rotatable shaft having a shoulder thereon, an antifriction bearing seated against said shoulder adapted to carry both radial and thrust loads, a clamping device on said shaft for applying axial pressure against said bearing to urge the latter against said shoulder, and means for removing the internal loads on said bearing upon overheating of said bearing comprising a shim of predetermined melting point material interposed between said clamping device and said shoulder.

2. In combination, a rotatable shaft having a shoulder, an antifriction bearing seated against said shoulder comprising a rolling-contact bearing unit adapted to carry both radial and thrust loads, means for preloading said bearing including a clamping device on said shaft for applying axial pressure against said bearing to urge the latter against said shoulder, and means for removing the preload on said bearing upon overheating of the latter comprising a shim of predetermined-melting-point material interposed between said clamping device and said shoulder.

3. The combination of claim 2 in which the bearing comprises at least two units each consisting of inner and outer races and rolling elements therebetween and the shim is clamped between the clamping device and the inner race of the adjacent bearing unit.

4. In combination, a rotatable shaft having a shoulder thereon, an antifriction bearing on said shaft consisting of at least two thrust bearing units, each of said units having inner and outer races and rolling elements therebetween, one of said bearing units having its inner race abutting said shoulder and having its thrust load lines directed away from said shoulder and said other bearing unit having its thrust load lines directed toward said shoulder, said shaft having a threaded portion adjacent the end of said bearing which is remote from said shoulder, means for preloading said bearing including a clamping device on said threaded portion for applying axial thrust against said bearing, and means for removing the preload on said bearing upon overheating of the latter including a shim of predetermined-melting-point material interposed between said clamping device and said shoulder.

5. In combination, a rotatable shaft having a shoulder thereon, an antifriction thrust bearing on said shaft abutting said shoulder and adapted to transmit axial thrust from said shoulder, said bearing including inner and outer races and rolling elements therebetween, a threaded portion on said shaft on the opposite side of said bearing from said shoulder, means for preloading said bearing including a nut threaded on said threaded portion for applying axial pressure against said bearing, and means for removing said preload on said bearing upon overheating of the latter comprising a shim of predetermined-melting-point material between said nut and said shoulder in direct heat conducting contact with said inner race of said bearing.

6. The combination of claim 5 in which the bearing consists of a plurality of thrust bearing units having their inner and outer races arranged in abutting relationship and all arranged to transmit thrust from said shoulder, and the means for preloading the bearing includes a like thrust bearing unit in thrust transmitting relationship with said first mentioned bearing units and arranged to transmit thrust as applied by said nut in the reverse direction toward said shoulder.

7. The combination of claim 6 in which the bearing unit adjacent the shoulder has its inner race abutting said shoulder and said shim is located between said nut and the inner race of said reverse thrust bearing unit.

8. In combination, a shaft having thereon a shoulder and a threaded portion spaced from said shoulder, a nut threaded thereon, a thrust bearing between said shoulder and said nut including at least two rolling-contact bearing units arranged in abutting relationship and capable of transmitting axial thrust, the bearing unit adjacent said shoulder having its thrust load lines directed toward said nut, and the bearing unit adjacent said nut having its thrust load lines directed toward said shoulder, and a low-melting-point shim interposed between said nut and said shoulder for relieving internal loads on said bearing upon overheating of the latter.

9. In combination, a rotatable shaft having a shoulder, a casing supporting said shaft having a shoulder spaced from said shaft-carried shoulder, an antifriction bearing on said shaft between said shoulders including inner and outer races and rolling elements therebetweeen, said bearing having its inner race abutting the shoulder on said shaft and its outer race abutting the shoulder on said casing, means for positioning said bearing relative to said shoulder on said shaft including a clamping device on said shaft, and means for relieving abnormal internal loads on said bearing elements upon overheating including a fusible shim between said clamping device and said shaft-carried shoulder.

References Cited

UNITED STATES PATENTS 3,231,317   1/1966   Dudar _____ 308—1

FRED C. MATTERN, Jr., Primary Examiner

S. F. SUSKO, Assistant Examiner